June 29, 1954   F. M. GUY   2,682,434
SHAFT HANGER
Filed May 27, 1950   4 Sheets-Sheet 1
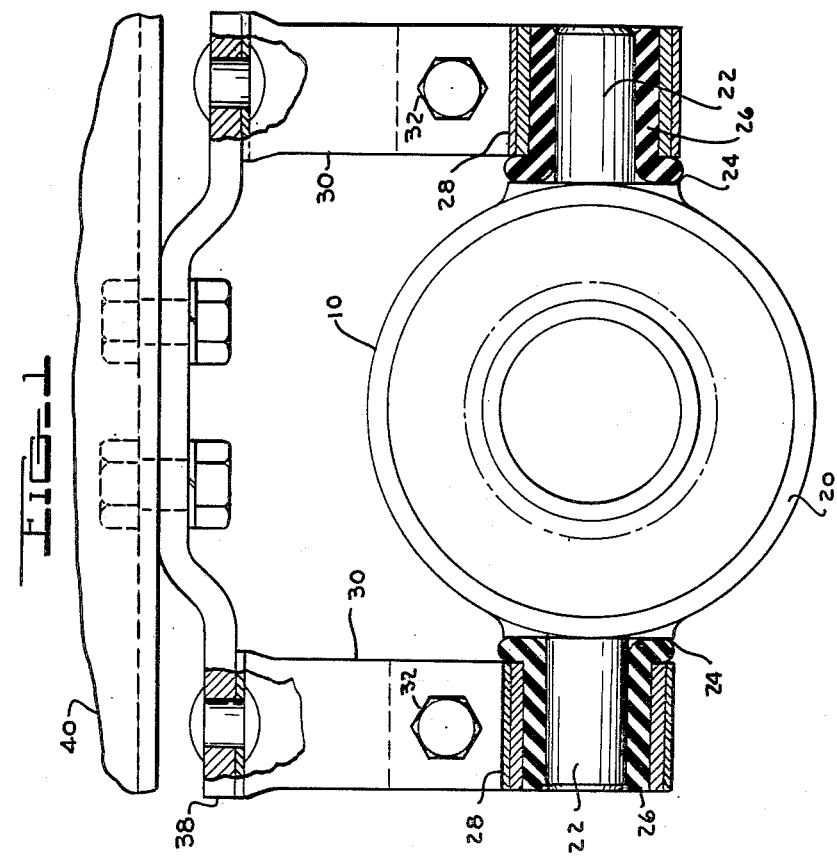
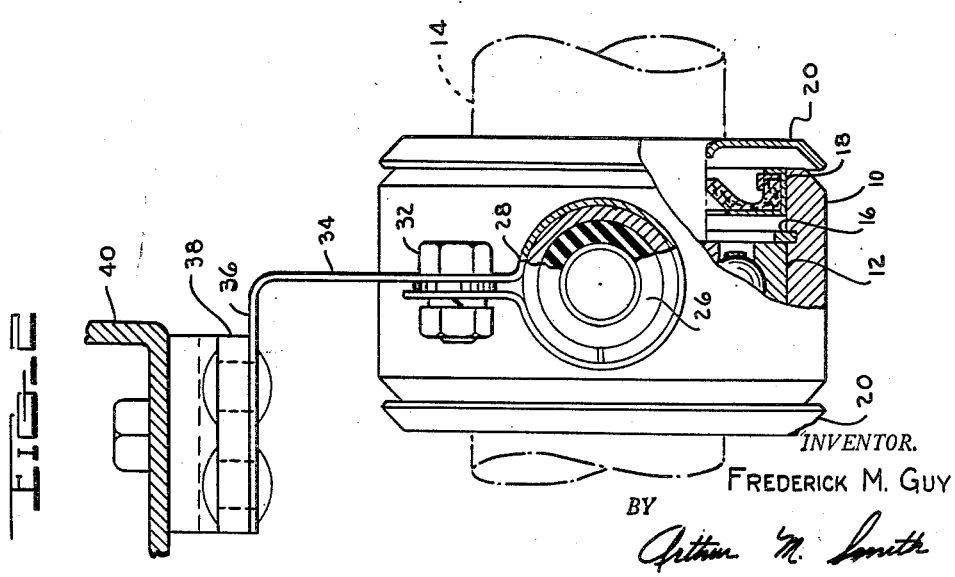
INVENTOR.
FREDERICK M. GUY
BY
Arthur M. Smith
ATTORNEY June 29, 1954   F. M. GUY   2,682,434
SHAFT HANGER
Filed May 27, 1950   4 Sheets-Sheet 2
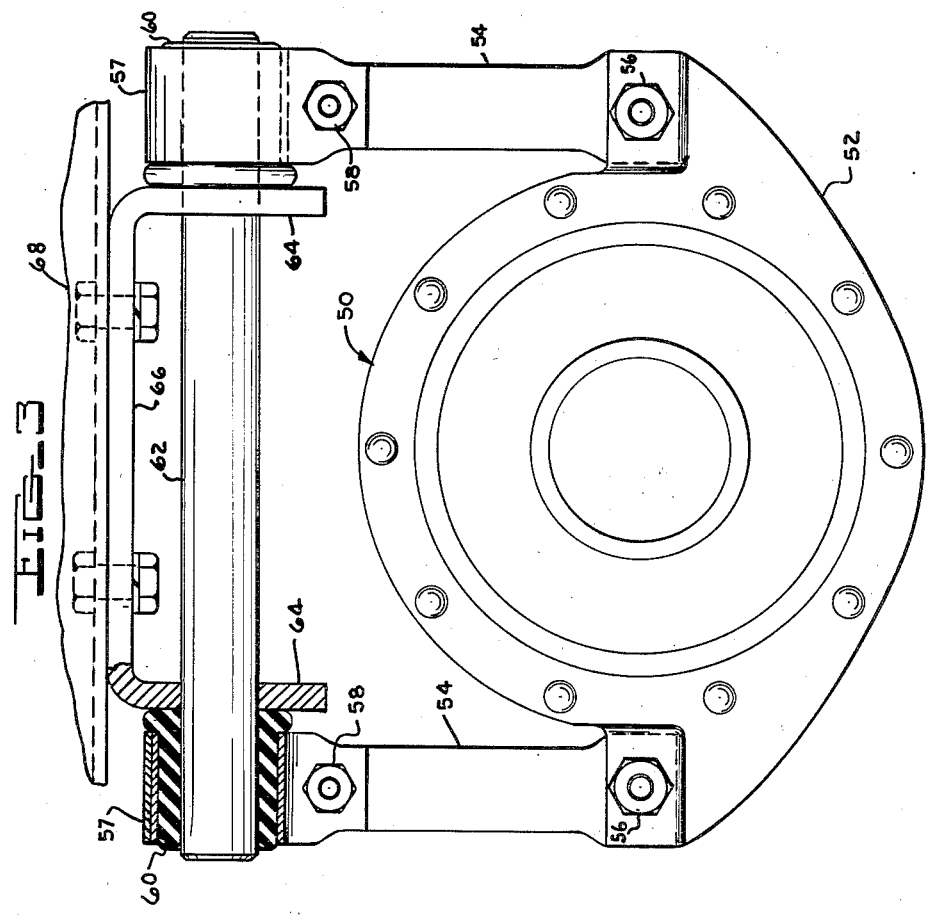
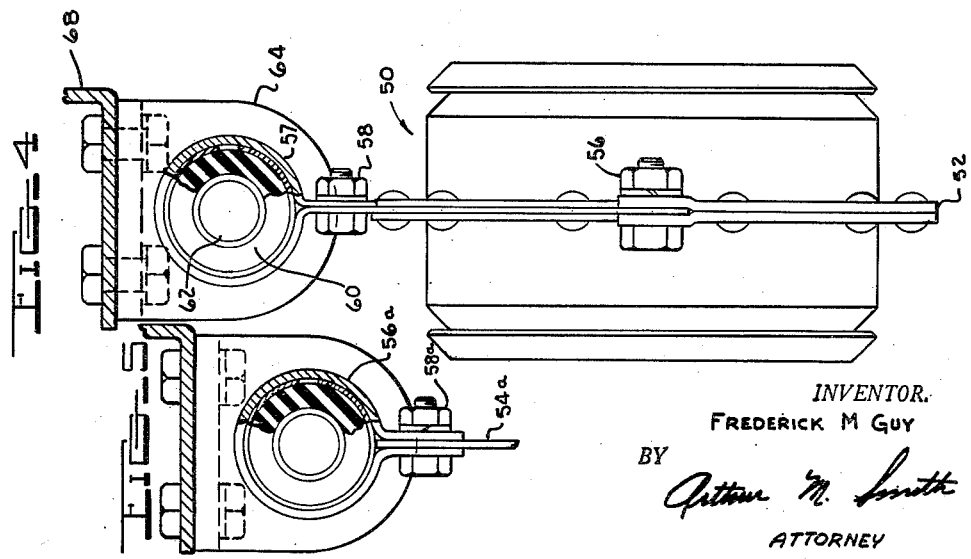
INVENTOR.
FREDERICK M GUY
BY Arthur M. Smith
ATTORNEY

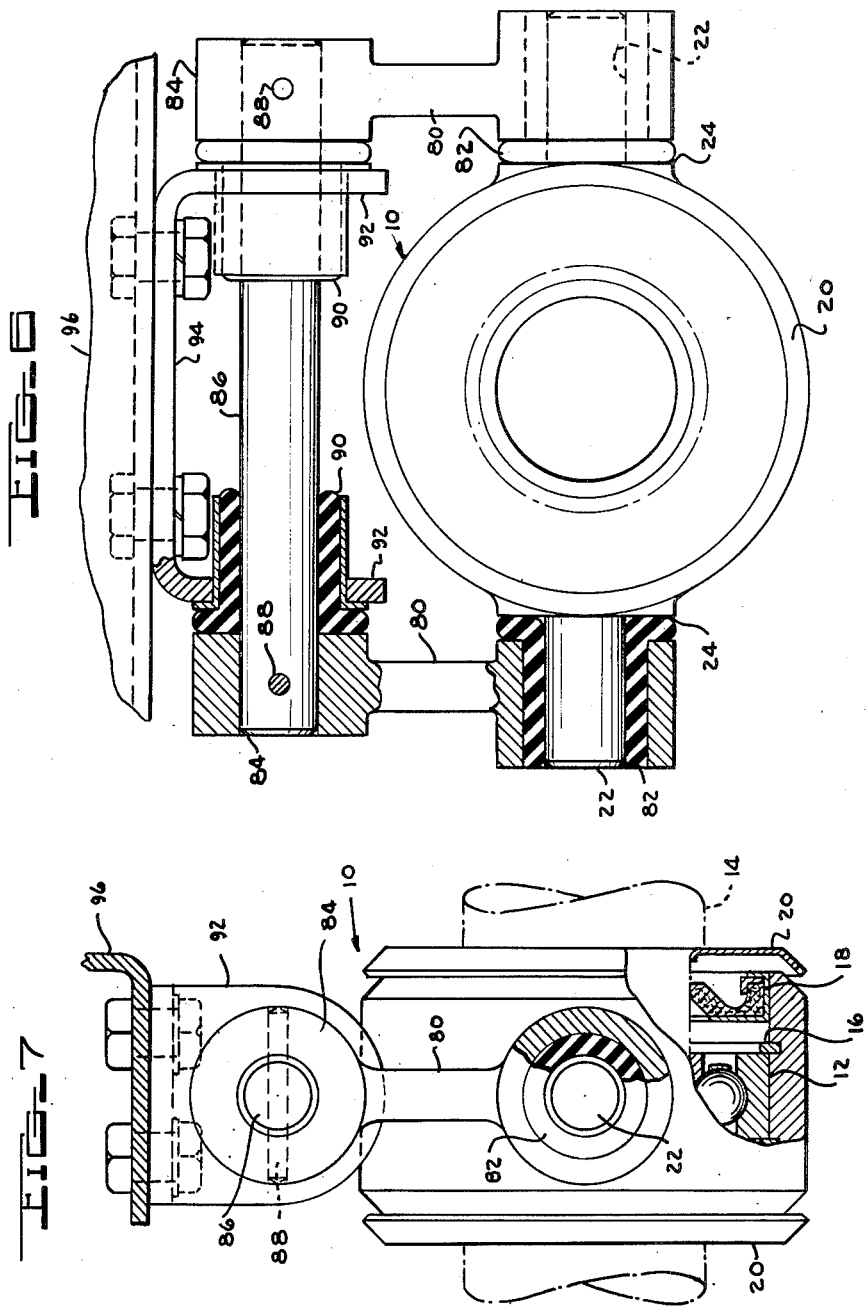

June 29, 1954
F. M. GUY
2,682,434
SHAFT HANGER
Filed May 27, 1950
4 Sheets-Sheet 4
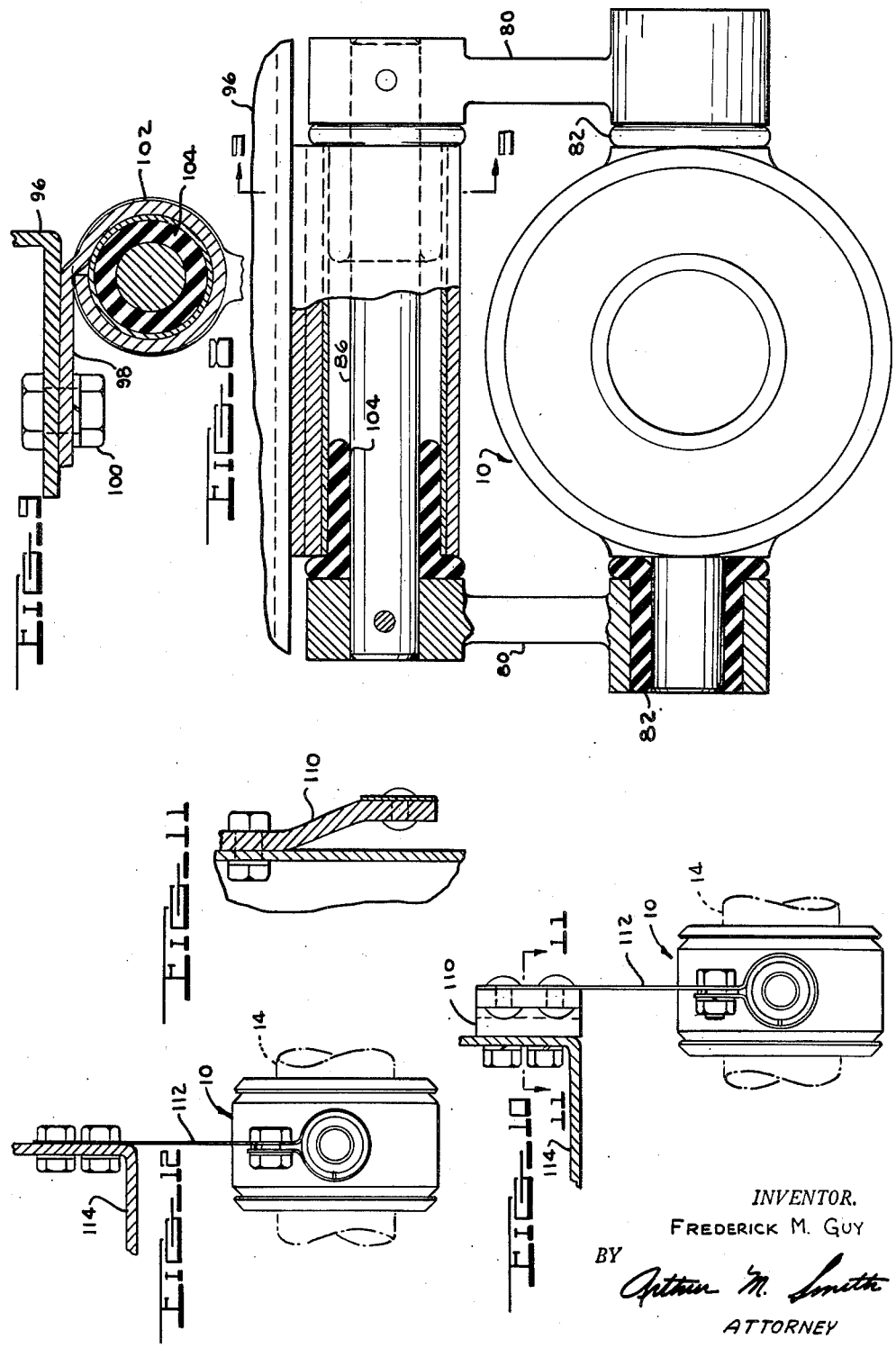
INVENTOR.
FREDERICK M. GUY
BY
Arthur M. Smith
ATTORNEY Patented June 29, 1954

2,682,434

UNITED STATES PATENT OFFICE 2,682,434

SHAFT HANGER

Frederick M. Guy, Detroit, Mich., assignor to U. S. Universal Joints Company, Detroit, Mich., a corporation of Michigan Application May 27, 1950, Serial No. 164,711

4 Claims. (Cl. 308—28)

The present invention relates to a resilient shaft hanger which is particularly, but not exclusively, adapted for use in motor vehicle constructions to provide a flexible support for a driven shaft or the like which may be subjected to forces causing movement thereof relative to a supporting member.

The shaft hanger of the present invention is particularly adapted for use in securing an intermediate driven shaft to a portion of the cross frame of a motor vehicle in such a manner as to permit relative movement of the said intermediate driven shaft relative to the vehicle chassis. Reference is made to my prior Patent No. 2,450,279 of September 28, 1948, for a more complete explanation of the use of a shaft hanger with respect to a motor vehicle.

In the same manner as was explained in the aforesaid patent, the shaft hanger of the present invention is also particularly desirable for use in connection with a floatingly mounted propeller shaft resiliently connected with a transmission shaft.

However, the invention is not limited to such uses, as it may be used wherever it is desired to provide a flexibly mounted shaft hanger construction in which the shaft is to be acoustically insulated from the suspending member to prevent transmission of noise, vibration, heat or the like from the shaft to the supporting member or vice versa.

The various embodiments of the present invention distinguish from that of the aforesaid patent in providing resilient or flexible supporting arms or members made from spring steel or the like so that the desired movement between the shaft and the cross frame of the vehicle will be permitted while providing the necessary support for the shaft.

Accordingly, it is a primary object of the present invention to provide a flexible shaft hanger which includes as part of its construction, flexible support members made of spring steel, or the like, permitting limited universal movement of the shaft with respect to the member from which the shaft is suspended.

It is another object of the present invention to provide a flexible shaft hanger constructed and arranged to permit desired limited universal movement of the shaft with respect to the member from which the shaft is suspended, and which is characterized by its relatively few and standard parts permitting it to be assembled and installed with ease and facility and enabling it to be constructed at a relatively low cost.

It is a further object of the present invention to provide a flexible shaft hanger in which all vibrations transmitted from the shaft to the supporting member or vice versa are absorbed in a resilient sound deadening support medium.

Other objects of this invention will appear in the following description and appended claims, reference being had to the accompanying drawings forming a part of this specification wherein like reference characters designate corresponding parts in the several views.

In the drawings:

Fig. 1 is a front elevational view, partly in section, of one embodiment of a shaft hanger of the present invention which is mounted on a supporting member.

Fig. 2 is a side elevational view partly in section of the embodiment of the invention shown in Fig. 1.

Fig. 3 is a front elevational view of another embodiment of a shaft hanger of the present invention supported from a supporting member.

Fig. 4 is a side elevational view, partly in section, of the embodiment of the invention shown in Fig. 3.

Fig. 5 is a fragmentary view, partly in section, of a modified form of the flexible shaft hanger arm shown in Figs. 3 and 4.

Fig. 6 is a front elevational view of another embodiment of the shaft hanger of the present invention supported from a supporting member.

Fig. 7 is a side elevational view of the embodiment of the invention shown in Fig. 6.

Fig. 8 is a front elevational view, partly in section, of another embodiment of the shaft hanger of the present invention.

Fig. 9 is a sectional view of the shaft hanger taken on the line 9—9 of Fig. 8.

Fig. 10 is a side elevational view of still another embodiment of the shaft hanger of the present invention.

Fig. 11 is a fragmentary sectional view of the embodiment of the present invention shown in Fig. 10 which is taken on the line 11—11 of Fig. 10.

Fig. 12 is a side elevational view of still another embodiment of the shaft hanger of the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

The accompanying drawings show various embodiments of the resilient shaft hanger of the present invention in which spring steel arms or members are substituted for the rigid arm members of shaft hangers heretofore known and used. Also included in the supporting structure of the shaft hangers are resilient bushings which are connected to the ends or adjacent the ends of the spring steel arms to insulate the shaft and bearings from the hanger supporting structure so that there is no transmission of noise and the like from the rotating shaft to the frame and vice versa, and further to permit limited pivotal movement between the members joined by the bushings.

Referring to Figs. 1 and 2 of the drawings, one embodiment of the present invention can be seen having a housing 10 within which is mounted a shaft journaling bearing 12 for rotatably supporting a shaft 14, shown in phantom. The bearing 12 is held in place in the housing 10 by means of retainer rings 16 disposed on opposite sides of the bearing 12. Any form of suitable grease sealing members 18 are mounted within the housing 10 in spaced relation to the bearing 12 and a pair of cover plates 20 are suitably secured to opposite ends of the housing 10.

A pair of studs 22 extend radially outwardly from the opposite sides of the housing 10. The outer ends of each of the studs 22 are machined to a reduced diameter forming a shoulder 24. A pair of split resilient bushings 26 surround each of the reduced end portions of the studs 22 and are seated against the shoulders 24. Annular clamping members 28 clamp the split bushings 26 under pressure to the end portions of the studs 22. The annular clamping members 28 are formed on the lower end of the spring steel arms or members 30, and are designed to have a circumference less than that of the unloaded resilient bushings 26, as can be seen by the spacing at 30. A suitable nut and bolt arrangement 32 is provided for each arm 30 to permit the clamping member 28 to be drawn tightly about the split resilient bushings 26 and thereby provide a loaded bushing on each of the studs 22.

Each of the arms 30 has a vertical lower portion 34 and a horizontal upper portion 36, and the upper end of each of the arms 30 is riveted to a transverse arm 38. The transverse arm or member 38 is in turn bolted to a supporting member 40 of the vehicle or the like. Thus, it can be seen that the flexible arms 30 can absorb any longitudinal movement of the shaft 14 in the vertical portion 34 thereof and can absorb any vertical movement of the shaft 14 in the horizontal portions 36 thereof. It is believed to be readily understood that the vertical portion 34 and the horizontal portion 36 of the arms 30 will also be able to absorb jointly any other movement of shaft 14 which may be a component of any horizontal, vertical or longitudinal movement of the shaft 14.

Further, it can be seen that there is no direct metal to metal contact between the shaft and the supporting member because of the resilient rubber bushings 26 which are interposed between the clamping members 28 and the studs 22, which bushings act to acoustically insulate transmission of sound from the shaft to the supporting member and vice versa. Also, by virtue of the split bushings which are used, the resilient bushings can be quickly mounted on the studs 22 and clamped in place in a loaded condition on the studs 22. This permits a more simplified operation for loading the bushings, and therefore will reduce the initial cost of installing the present shaft hanger.

Reference is now made to Figs. 3, 4 and 5 for a showing of a modified form of the present invention. Here, the main bearing (not shown) is mounted in a housing 50 having an annular flange portion 52 to which the lower ends of flexible spring steel arms or members 54 are secured by means of suitable nuts and bolts 56 or the like.

The upper ends of each of the arms 54 have a clamping member 57 similar to the clamping member 28 of the previous embodiment of this invention. The clamping member 57 can be drawn together by suitable nut and bolt arrangement 58 for loading the split resilient bushings 60 which are mounted on opposite ends of the pin 62. The pin 62 which supports the upper end of each of the flexible arms 54 through the split resilient bushings 60 is in turn supported by the depending arm portions 64 of the bracket member 66. The latter is rigidly secured to the supporting member 68 of a vehicle or the like. In Fig. 5 of the drawings, a modified form of clamping members can be seen having a flexible spring steel arm or member 54a which is secured to the clamping member 56a by means of a suitable nut and bolt arrangement 58a. This particular arrangement of having the clamping member 56a and the resilient arms 54a as separate members is particularly advantageous where it is desired to use shaft hangers having arms of different lengths while maintaining the cost of the arms at a minimum as is more fully described in my co-pending application, Serial No. 164,713, filed May 27, 1950.

The modification of the invention shown in Figs. 3, 4 and 5 is particularly well adapted for use where it is necessary for the shaft hanger to allow limited longitudinal movement of the shaft (not shown) which is supported thereby. This modification also has rubber resilient bushings disposed between the flexible arms 54 and the pin 62 so that there is no direct metal to metal contact between the shaft and the supporting member of the vehicle, thereby to acoustically insulate transmission of sound from the shaft to the supporting member. Further, this modification also has a split rubber resilient bushing so that in assembling the shaft hanger a loading can be applied to the bushing in a relatively simple manner so as to reduce the installation cost.

Referring now to Figs. 6 and 7, another modified form of the present invention can be seen. This modification has a housing 10 and a shaft journaling bearing 12 which is substantially the same as that of the embodiment of the present invention shown in Figs. 1 and 2. In this embodiment of the invention, arms 80 are provided which are rigidly constructed and which carry in their lower ends a preloaded resilient sleeve or bushing 82. As can be seen, the studs 22 extend into the resilient sleeve or bushing 82. The upper end of each of the arms 80 are provided with eyes 84 into which the opposite ends of the pin 86 extend. The pin is locked against rotation in each of these eyes by means of the pins 88.

A pair of rubber resilient bushings 90 are mounted on the pins 86 and are held by the depending arms 92 of the bracket member 94. The latter is supported by a supporting member 96 of the vehicle or the like. In the use of this shaft hanger, movement of the shaft 14 will be permitted to the extent which the bushings 82 and 90 allow rotational movement of the pin 86 and the stud 22. Further, the shaft 14 will be permitted to be moved the limited amount which the depending arms 92 can be flexed. Thus, it can be seen that the present modification of the invention is well adapted for use where it is desired that the shaft hanger should permit a limited longitudinal swinging motion of the shaft as well as a more limited transverse swinging motion. Further, it can be seen that the bushings 82 and 90 will yieldably allow transverse movement of the shaft.

As in the previous modifications described hereinabove, direct metal to metal contact between the shaft and the supporting member of the vehicle is prevented by the resilient rubber bushings which act to provide acoustic insulation.

Reference is now made to Figs. 8 and 9 of the drawings for a showing of still another modified form of the present invention. Here, the construction and arrangement of the housing 10, arms 80, pin 86, and the means for joining these members together is the same as shown and described in the embodiment of this invention in Figs. 6 and 7. This embodiment of the invention distinguishes from the previously described embodiment in providing a different supporting arm or member for supporting the pin 86 from the supporting member 96 of the vehicle or the like. In the present modification, a cantilever arm or member 98 is secured to the supporting member 96 by means of a nut and bolt 100. At the other end of this member is a cylindrical eye portion 102 within which the resilient bushings 104 are mounted.

This modification of the invention is especially well adapted for use where it is desired to permit limited vertical movement of the supported shaft. This limited movement can be obtained by flexure of the arms 98.

Two additional modifications of the present invention are shown in Figs. 10 and 12. These modifications are very similar to the modification shown in Figs. 1 and 2 of the drawings. The modification shown in Fig. 10 distinguishes from that shown in Figs. 1 and 2 in providing for the transverse support member 110 to be mounted on a vertical surface of the vehicle rather than a horizontal surface as shown in Fig. 2, and the flexible spring steel arms 112 are entirely upright members.

The embodiment shown in Fig. 12 is identical with that of Fig. 10 with the exception that the flexible spring steel arms 112 are mounted directly on the support member 114 of the motor vehicle rather than on the transverse member 110 shown in Fig. 10.

The modification shown in Figs. 10 and 12 have the same advantages in use as the modification shown in Figs. 1 and 2. However, the modifications of Figs. 10 and 12 are more suitable for use when it is desired primarily to have the shaft hanger absorb longitudinal vibrations and movements of the shaft 14.

From the foregoing, it can be seen that a shaft hanger is provided which permits universal movement of the shaft being supported thereby with respect to the supporting surface of the vehicle. Further, the shaft hanger is constructed from relatively few and standard parts, but it can be assembled and installed with ease and facility enabling it to be constructed at a relatively low cost. The shaft hanger is also constructed so that vibration and sound will not be transmitted from the shaft to the supporting member on the vehicle.

Having thus described my invention, what I claim is:

1. A flexible shaft hanger adapted for flexibly and resiliently supporting a rotatable shaft of a vehicle comprising a housing, a shaft journaling bearing mounted in said housing, a suspension mechanism for operatively suspending said housing from a supporting surface of said vehicle, said suspension mechanism including a pair of resilient flexible arms disposed on opposite sides of said housing and operatively connected at their lower ends to said housing, said arms being formed from thin strips of spring steel which allow such arms to be twisted and deflected from their normal load carrying positions when forces are applied thereto and upon release of such forces the spring characteristics of the steel will restore the arms to their normal positions, the load on the bearing being carried by said arms so as to permit universal movement of the housing relative to the supporting surface, and a resilient bushing operatively disposed at at least one end of each arm so that direct metal to metal contact from the housing through the arms to the supporting surface will be prevented.

2. A flexible shaft hanger adapted for flexibly and resiliently supporting a rotatable shaft of a vehicle comprising a housing, a shaft journaling bearing mounted in said housing, a suspension mechanism for operatively suspending said housing from a supporting surface of said vehicle, said suspension mechanism including a pin, a pair of resilient flexible arms disposed on opposite sides of said housing and operatively connected at their lower ends of said housing, said arms being formed from thin strips of spring steel which allow such arms to be twisted and deflected from their normal load carrying positions when forces are applied thereto and upon release of such forces the spring characteristics of the steel will restore the arms to their normal positions, the load on the bearing being carried by said arms so as to permit universal movement of the housing relative to the supporting surface, said arms having clamp members at their upper ends, and split resilient bushings mounted in said clamp members and clamped on said pin.

3. A flexible shaft hanger adapted for flexibly and resiliently supporting a rotatable shaft of a vehicle comprising a housing, having a pair of outwardly extending studs, a shaft journaling bearing mounted in said housing, a suspension mechanism for operatively suspending said housing from a supporting surface of said vehicle, said suspension mechanism including a pair of resilient flexible arms disposed on opposite sides of said housing and adapted to be operatively connected at their upper ends to a supporting surface, the lower ends of said arms having rubber bushings mounted therein in which said studs are carried, said arms being formed from thin strips of spring steel which allow them to be twisted and deflected from their normal load carrying positions when forces are applied thereto and upon release of such forces the spring characteristics of the steel will restore the arms to their normal positions, the load on the bearing being carried by said arms so as to permit universal movement of the housing relative to the supporting surface.

4. A flexible shaft hanger adapted for flexibly and resiliently supporting a rotatable shaft of a vehicle comprising a housing having a pair of outwardly extending studs, a shaft journaling bearing mounted in said housing, a suspension mechanism for operatively suspending said housing from a supporting surface of said vehicle, said suspension mechanism including a support bracket, a pair of resilient flexible arms disposed on opposite sides of said housing and connected at their upper ends to said support bracket, the upper portions of said arms being horizontally disposed and each connected at one end in cantilever fashion to said bracket with the lower portions depending vertically from the unattached ends of the upper portions, the lower ends of said arms having rubber bushings mounted therein in which said studs are carried, said arms being formed from thin strips of spring steel which allow them to be twisted and deflected from their normal load carrying positions when forces are applied thereto and upon release of such forces the spring characteristics of the steel will restore the arms to their normal positions, the load on the bearing being carried by said arms so as to permit universal movement of the housing relative to the support bracket.

References Cited in the file of this patent

UNITED STATES PATENTS

| Number | Name | Date |
|---|---|---|
| 1,915,058 | French | June 20, 1933 |
| 2,162,159 | Cole | June 13, 1939 |
| 2,195,647 | Guy | Apr. 2, 1940 |
| 2,341,821 | Schwinn | Feb. 15, 1944 |
| 2,395,143 | Prewitt | Feb. 19, 1946 |
| 2,450,279 | Guy | Sept. 28, 1948 |

FOREIGN PATENTS

| Number | Country | Date |
|---|---|---|
| 477,183 | France | Sept. 29, 1915 |
| 629,502 | Great Britain | Sept. 21, 1949 |